(12) United States Patent
Kitaji

(10) Patent No.: US 9,155,015 B2
(45) Date of Patent: Oct. 6, 2015

(54) RADIO COMMUNICATION DEVICE

(75) Inventor: Mitsuhiro Kitaji, Yokohama (JP)

(73) Assignee: Kyocera Corporation, Kyoto (JP)

( * ) Notice: Subject to any disclaimer, the term of this patent is extended or adjusted under 35 U.S.C. 154(b) by 584 days.

(21) Appl. No.: 12/671,492

(22) PCT Filed: Jul. 29, 2008

(86) PCT No.: PCT/JP2008/063606
§ 371 (c)(1),
(2), (4) Date: Jun. 15, 2010

(87) PCT Pub. No.: WO2009/017133
PCT Pub. Date: Feb. 5, 2009

(65) Prior Publication Data
US 2010/0255845 A1     Oct. 7, 2010

(30) Foreign Application Priority Data

Jul. 30, 2007  (JP) .................................. 2007-198206

(51) Int. Cl.
*H04W 36/00* (2009.01)
*H04W 36/30* (2009.01)

(52) U.S. Cl.
CPC .......... *H04W 36/30* (2013.01); *H04W 36/0083* (2013.01)

(58) Field of Classification Search
CPC .................................................. H04W 36/30
USPC ........................................ 455/436, 438, 444
See application file for complete search history.

(56) References Cited

U.S. PATENT DOCUMENTS

| | | | |
|---|---|---|---|
| 6,377,806 B1 | 4/2002 | Tokuyoshi | |
| 8,064,911 B2 * | 11/2011 | Kim et al. | 455/438 |
| 2003/0119508 A1 * | 6/2003 | Gwon et al. | 455/436 |
| 2007/0077893 A1 * | 4/2007 | Sasao | 455/73 |
| 2007/0099617 A1 * | 5/2007 | Sipila | 455/436 |
| 2007/0133472 A1 * | 6/2007 | Kim et al. | 370/332 |

FOREIGN PATENT DOCUMENTS

| | | |
|---|---|---|
| EP | 1 575 320 | 9/2005 |
| JP | 10-051853 | 2/1998 |
| JP | 2933615 | 5/1999 |
| JP | 11-215545 | 8/1999 |

(Continued)

OTHER PUBLICATIONS

International Search Report for PCT/JP2008/063606, mailed Oct. 28, 2008, 5 pages.

(Continued)

*Primary Examiner* — Chuck Huynh
(74) *Attorney, Agent, or Firm* — Duane Morris LLP

(57) ABSTRACT

A radio terminal (100) according to a present invention stores a handover threshold in association with an application being executed, when the communication quality of the application is degraded, the handover threshold being based on a piece of radio state information equivalent to that at a time when the communication quality is determined to be degraded. The radio terminal (100) stores the amount of variation of the radio state information in association with the radio communication system. The radio terminal (100) executes handover to a different radio communication system on the basis of the radio state information, the stored handover threshold and the stored amount of the variation.

6 Claims, 12 Drawing Sheets

S2

| SYSTEM BEFORE HANDOVER | SYSTEM AFTER HANDOVER | AMOUNT OF VARIATION OF RADIO 1 | AMOUNT OF VARIATION OF RADIO 2 | AMOUNT OF VARIATION OF RADIO 3 | ... | MEAN VARIATION AMOUNT |
|---|---|---|---|---|---|---|
| WLAN | EVDO | RSSI-3dBm | RSSI-3dBm | RSSI-3dBm | ... | RSSI-3dBm |
| EVDO | WLAN | C/I-0.5dB | C/I-0.2dB | C/I-1.2dB | ... | C/I-0.7dB |
| EVDO | WiMAX | C/I-1.3dB | C/I-2.2dB | C/I-2.8dB | ... | C/I-2.0dB |
| : | : | : | : | : | : | : |

(56) References Cited

FOREIGN PATENT DOCUMENTS

| JP | 2005-236487 | 9/2005 |
|---|---|---|
| JP | 2006-173665 | 6/2006 |
| JP | 2006-295410 | 10/2006 |
| JP | 2007-027952 | 2/2007 |
| JP | 2007-088773 | 4/2007 |
| JP | 4312155 | 5/2009 |
| WO | WO-2006/012377 | 2/2006 |

OTHER PUBLICATIONS

Notification of Reason(s) for Refusal (translation) for JP 2007-198206, mailed Jan. 10, 2012, 4 pages.

* cited by examiner

FIG.5

| APPLICATION | SYSTEM | TYPE | VALUE |
|---|---|---|---|
| G711 | EVDO | C/I | 3 |
| | | RSSI | -85 |
| | | C/I | 1 |
| | | RSSI | -93 |
| | | C/I | 3 |
| | | RSSI | -93 |
| ⋮ | ⋮ | ⋮ | ⋮ |

| APPLICATION | SYSTEM | THRESHOLD TYPE | THRESHOLD VALUE |
|---|---|---|---|
| G711 | EVDO | C/I | 3 |
| G711 | WLAN | RSSI | -85 |
| G729 | EVDO | C/I | -2 |
| G729 | WiMAX | RSSI | -92 |
| G729 | WLAN | RSSI | -78 |
| ⋮ | ⋮ | ⋮ | ⋮ |

TB1

| SYSTEM BEFORE HANDOVER | SYSTEM AFTER HANDOVER | AMOUNT OF VARIATION OF RADIO 1 | AMOUNT OF VARIATION OF RADIO 2 | AMOUNT OF VARIATION OF RADIO 3 | ... | MEAN VARIATION AMOUNT |
|---|---|---|---|---|---|---|
| WLAN | EVDO | RSSI-3dBm | RSSI-3dBm | RSSI-3dBm | ... | RSSI-3dBm |
| EVDO | WLAN | C/I-0.5dB | C/I-0.2dB | C/I-1.2dB | ... | C/I-0.7dB |
| EVDO | WiMAX | C/I-1.3dB | C/I-2.2dB | C/I-2.8dB | ... | C/I-2.0dB |
| ... | ... | ... | ... | ... | ... | ... |

FIG.10

| SYSTEM BEFORE HANDOVER | SYSTEM AFTER HANDOVER | REACHING TIME 1 | REACHING TIME 2 | REACHING TIME 3 | ... | MEAN CONNECTION TIME |
|---|---|---|---|---|---|---|
| WLAN | EVDO | 8200ms | 9500ms | 8100ms | ... | 8400ms |
| EVDO | WLAN | 600ms | 600ms | 700ms | ... | 620ms |
| EVDO | WiMAX | 5700ms | 4300ms | 5200ms | ... | 5100ms |
| ... | ... | ... | ... | ... | ... | ... |

| SYSTEM BEFORE HANDOVER | OPERATOR BEFORE HANDOVER | SYSTEM AFTER HANDOVER | OPERATOR AFTER HANDOVER | REQUIRED TIME | AMOUNT OF VARIATION |
|---|---|---|---|---|---|
| EVDO | Operator_A | WiMAX | Operator_A | 3500ms | C/I -1.2dB |
| | | WiMAX | Operator_B | 6500ms | C/I -2.1dB |
| | | WLAN | Operator_A | 300ms | C/I -0.1dB |
| | | WLAN | Operator_C | 900ms | C/I -0.5dB |
| | | WLAN | — | 2500ms | C/I -1.0dB |
| WiMAX | Operator_A | EVDO | Operator_A | 4300ms | RSSI -2.1dBm |
| | | WiMAX | Operator_B | 6500ms | RSSI -2.9dBm |
| | | WLAN | Operator_A | 300ms | RSSI -0.1dBm |
| WiMAX | Operator_B | EVDO | Operator_A | 9000ms | RSSI -3.5dBm |
| | | WiMAX | Operator_A | 3300ms | RSSI -1.1dBm |
| | | WLAN | Operator_A | 1200ms | RSSI -0.5dBm |
| | | WLAN | Operator_C | 800ms | RSSI -0.2dBm |
| WLAN | — | EVDO | Operator_A | 9000ms | RSSI -3.2dBm |
| | | WiMAX | Operator_A | 3200ms | RSSI -1.5dBm |
| | | WiMAX | Operator_B | 5700ms | RSSI -2.5dBm |
| | | | | | |

TB2

RADIO COMMUNICATION DEVICE

CROSS-REFERENCE TO RELATED APPLICATIONS

This is a U.S. National Phase Application of International Application No. PCT/JP2008/063606 filed Jul. 29, 2008, which claims priority to Japanese Patent Application No. 2007-198206 filed Jul. 30, 2007, the disclosures of which are incorporated herein by reference in their entirety.

TECHNICAL FIELD

The present invention relates to a radio communication device that executes a handover in accordance with communication quality of an application.

BACKGROUND ART

In recent years, an environment for a radio communication device to simultaneously use multiple radio communication systems of different communication schemes has been developed by a wide spread of radio communication technologies. For example, a study has been carried out to provide a radio communication device configured to be connectable to both cdma2000 n×evolution-data only (EV-DO), which is one of standards in the 3rd generation mobile system, and a wireless LAN system which is compliant with IEEE802.11 or the like.

Such a radio communication device connectable to multiple radio communication systems monitors a communication quality such as the state of a radio signal (RSSI, for example) or the throughput, the radio signal received from a radio base station currently connected to the radio communication device. The radio communication device is able to execute a handover to a radio base station in a different radio communication system before the communications in execution are cut off due to deterioration in the communication quality. (For example, Patent Document 1).

Patent Document 1: JP-A 2004-561996 (pages 11 to 12, FIG. 5)

DISCLOSURE OF THE INVENTION

However, the above-described conventional radio communication device has the following problem. Specifically, the radio communication device uses multiple applications including a real-time application and a non-real-time application. The real-time application includes a voice call using VoIP, and the like, whereas the non-real-time application includes browsing of a web site, and the like. The real-time application and the non-real-time application have different communication quality thresholds at each of which the radio communication device needs to execute a handover to a different radio communication system.

Moreover, the radio communication device connectable to multiple radio communication systems of different communication schemes uses different values (radio state information) for the respective radio communication systems to indicate the states of radio signals, such as RSSI, the values equivalent to the communication quality thresholds at which the radio communication device needs to execute handovers. Furthermore, the radio communication device requires different lengths of time to execute handovers depending on the way to provide services, e.g., the method to authenticate the radio communication device, of each of the communication carriers providing radio communication systems.

In other words, the above-described conventional radio communication device has a problem that the radio communication device is incapable of executing a handover to a different radio communication system at an appropriate timing for each application without affecting an application which the radio communication device currently executes.

The present invention has been made in consideration of such circumstances, and has an objective of providing a radio communication device which is capable of executing a handover to a different radio communication system at an appropriate timing for each application without affecting the application.

In order to solve the aforementioned problem, the present invention has the following aspects. Firstly, a first aspect of the present invention is summarized as a radio communication device (radio terminal 100, for example) which is configured to be connectable to multiple radio communication systems (radio communication systems 10, 20 and 30, for example) of different communication schemes and which is configured to perform communications with a communication destination device through a radio base station by use of a predetermined application (VoIP, for example), the radio communication device comprising: a radio state information acquirer (radio state information acquirer 103) configured to acquire radio state information (RSSI, for example) indicating a state of a radio signal transmitted to and received from the radio base station; a quality checker (application quality processor 107) configured to check whether or not the communication quality of the application is degraded; a threshold storage processor (handover controller 109 and storage 111) configured to store therein a handover threshold (handover threshold TH) in association with the application when the quality checker determines that the communication quality is degraded, the handover threshold being based on a piece of the radio state information equivalent to that at a time when the communication quality is determined to be degraded; a handover executor (handover controller 109) configured to execute a handover to a different radio communication system; and a variation storage processor (handover controller 109 and storage 111) configured to store therein the amount of variation (variation V) of the radio state information in association with the radio communication system, the variation occurred while the handover executor executes the handover, wherein the handover executor executes the handover to the different radio communication system on the basis of the radio state information acquired by the radio state information acquirer, the handover threshold stored in the threshold storage processor, and the amount of variation stored in the variation storage processor.

The above radio communication device stores the handover threshold in association with the application, the handover threshold being based on a piece of radio state information equivalent to that at a time when the communication quality of the application is determined to be degraded. The above radio communication device also stores the amount of variation of the radio state information in association with the radio communication system, the variation occurred during the handover execution. The radio communication device executes a handover to a different radio communication system on the basis of the radio state information, the handover threshold, and the amount of variation.

Accordingly, it is possible to set a handover threshold, which is based on the radio state information affecting the communication quality of the application, in consideration of the variation range of the value of the radio state information which may vary during the handover execution. In other words, the above radio communication device can execute a handover to a different radio communication system at a timing appropriate for each application without affecting the application.

A second aspect of the present invention is summarized as the radio communication device according to the first aspect of the invention, wherein the handover executor determines a value of the radio state information at which the handover executor is to start the handover, on the basis of the handover threshold and the amount of variation.

A third aspect of the present invention is summarized as the radio communication device according to one of the first and second aspect of the invention, further comprising: a required time storage processor (handover controller 109 and storage 111) configured to store time (time T3) in association with the radio communication system, the time required for the handover executor to execute the handover to the different radio communication system, wherein the handover executor executes the handover to the different radio communication system on the basis of the radio state information, the handover threshold, the amount of variation, and the required time.

A fourth aspect of the present invention is summarized as the radio communication device according to the third aspect of the invention, wherein the handover executor executes the handover to a radio communication system whose required time is short.

A fifth aspect of the present invention is summarized as a radio communication device (radio terminal 100) which is configured to be connectable to multiple radio communication systems (radio communication systems 10, 20 and 30) of different communication schemes and which is configured to perform communications with a communication destination device (communication destination device 200) through a radio base station (radio base station 11, for example) by use of a predetermined application (VoIP, for example), the radio communication device comprising: a radio state information acquirer (radio state information acquirer 103) configured to acquire radio state information (RSSI, for example) indicating a state of a radio signal transmitted to and received from the radio base station; a quality checker (application quality processor 107) configured to check whether or not the communication quality of the application is degraded; a threshold storage processor (handover controller 109 and storage 111) configured to store therein a handover threshold (handover threshold TH) in association with the application when the quality checker determines that the communication quality is degraded, the handover threshold being based on a piece of the radio state information equivalent to that at a time when the communication quality is determined to be degraded; a handover executor (handover controller 109) configured to execute a handover to a different radio communication system; and a reaching time storage processor (handover controller 109 and storage 111) configured to store therein reaching time (reaching time T2) in association with the radio communication system while the handover executor executes the handover to the different radio communication system, the reaching time required for the radio state information to reach the handover threshold associated with a radio communication system before a handover, wherein the handover executor executes the handover to the different radio communication system on the basis of the radio state information acquired by the radio state information acquirer, the handover threshold stored in the threshold storage processor, and the reaching time stored in the reaching time storage processor.

The above radio communication device stores the handover threshold in association with the application, the handover threshold being based on a piece of radio state information equivalent to that at a time when the communication quality of the application is determined to be degraded. The above radio communication device also stores the reaching time in association with the radio communication system, the reaching time required for the radio state information to reach a handover threshold associated with the radio communication system before the handover. The radio communication device executes a handover to a different radio communication system on the basis of the radio state information, the handover threshold, and the reaching time.

Accordingly, it is possible to set a handover threshold, which is based on the radio state information affecting the communication quality of the application, in consideration of the reaching time required for the radio state information to reach a handover threshold associated with the radio communication system before the handover. In other words, the above radio communication device can execute a handover to a different radio communication system at a timing appropriate for each application without affecting the application.

A sixth aspect of the present invention is summarized as the radio communication device according to the fifth aspect of the invention, wherein the handover executor determines a value of the radio state information at which the handover executor is to start the handover, on the basis of the handover threshold and the reaching time.

The aspects of the present invention make it possible to provide a radio communication device which is capable of executing a handover to a different radio communication system at an appropriate timing for each application without affecting the application.

BRIEF DESCRIPTION OF THE DRAWINGS

FIG. 5 is a diagram showing an example of radio state information according to the first embodiment of the present invention.

FIG. 6 is a diagram showing an example of a handover threshold table according to the first embodiment of the present invention.

FIG. 10 is a diagram showing an example of reaching time information according to the modified example of the first embodiment of the present invention.

FIG. 13 is a diagram showing an example of a handover threshold table according to the second embodiment of the present invention.

BEST MODES FOR CARRYING OUT THE INVENTION

Figure 1:
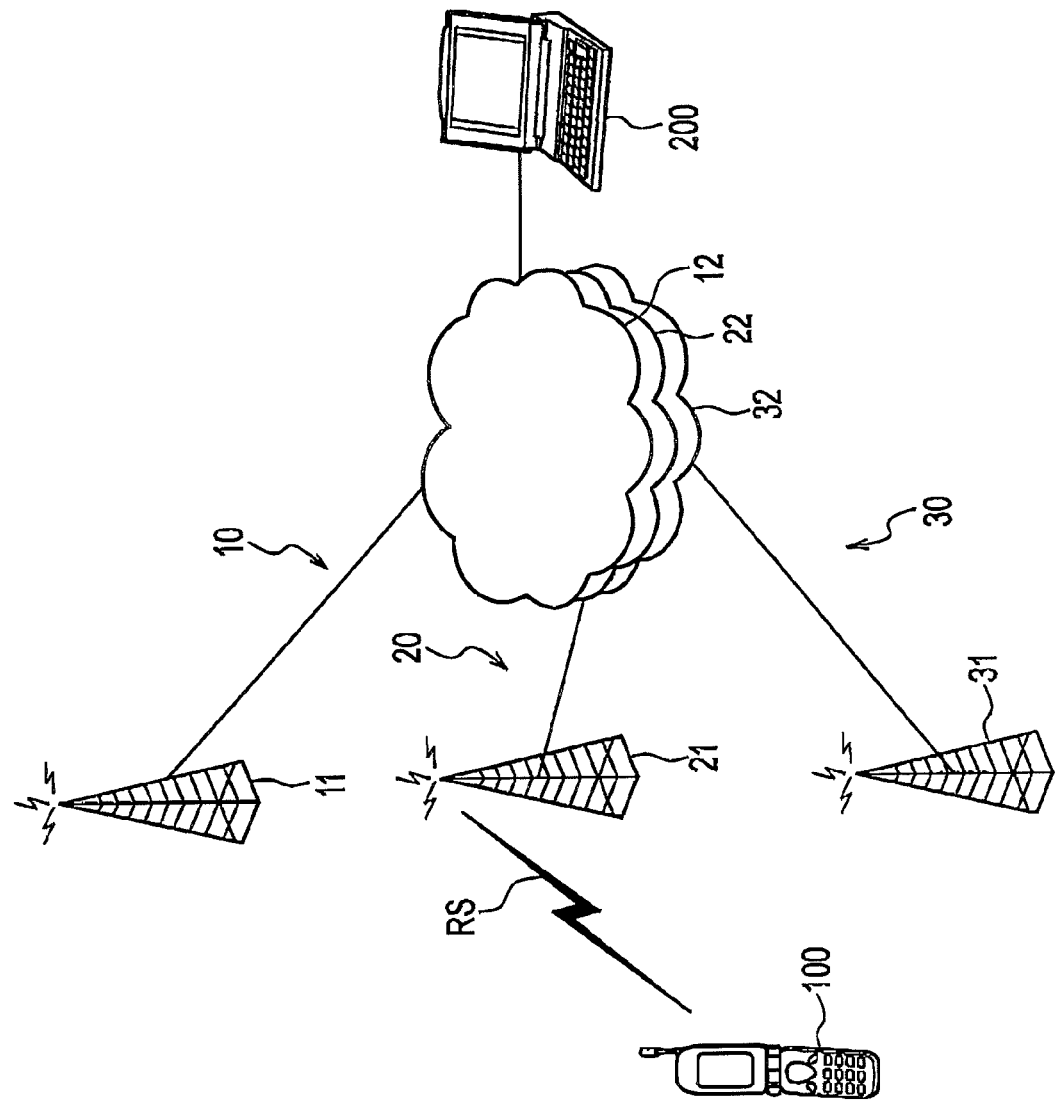
FIG. 1 is a diagram showing an overall schematic configuration of a communication network including a radio communication device according to a first embodiment of the present invention.

Next, embodiments of the present invention are described. Specifically, descriptions are given of (1) a first embodiment, (2) a second embodiment, and (3) other embodiments. A description of the first embodiment is given as to how a radio communication device executes a handover to a different radio communication system by use of the amount of variation of radio state information (RSSI, for example) or by use of a reaching time required for a communication quality of an application to reach a handover threshold. In addition, a description of the second embodiment is given as to how a radio communication device executes a handover to a different radio communication system on the basis of a time required to execute a handover to a different radio communication system.

Note that, throughout the following descriptions of the drawings, the same or like parts bear the same or like reference numerals. It should be noted, however, that the drawings are schematic, and that the dimensional proportions and the like are different from their actual values.

Accordingly, specific dimensions and the like should be inferred based on the descriptions given below. Moreover, dimensional relationships and dimensional proportions may differ from one drawing to another in some parts, of course.

(1) First Embodiment

As described previously, in the first embodiment, the radio communication device executes the handover to the different radio communication system by use of the amount of variation of the radio state information (RSSI, for example) or by use of the reaching time required for the communication quality of the application to reach the handover threshold.

(1.1) Overall Schematic Configuration of Communication Network

FIG. 1 is a diagram showing an overall schematic configuration of a communication network including the radio communication device according to the present embodiment.

A radio terminal 100 is a compact radio communication device which is portable by a user. The radio terminal 100 is configured to be connectable to a radio communication system 10, a radio communication system 20, and a radio communication system 30. The radio terminal 100 will be hereinbelow referred to as an MN 100 (standing for Mobile Node) as appropriate.

The radio terminal 100 executes a predetermined application, e.g., a voice call application using VoIP in the present embodiment. The radio terminal 100 performs communications with a communication destination device 200 through a radio base station 11, a radio base station 21, or a radio base station 31. Specifically, the radio terminal 100 executes a voice call application here.

A communication destination device 200 executes a voice call application using VoIP, in the same way as the radio terminal 100 does. The communication destination device 200 will be hereinbelow referred to as a CN 200 (Corresponding Node) as appropriate.

The radio communication system 10 includes the radio base station 11 and a backbone network 12. The radio communication system 10 is compliant with cdma2000 n×evolution-data only (EV-DO), which is one of standards in the 3rd generation mobile system.

The radio communication system 20 includes the radio base station 21 and a backbone network 22. The radio communication system 20 is compliant with a standard of mobile WiMAX, which is specified in IEEE802.16e and the like.

The radio communication system 30 includes the radio base station 31 and a backbone network 32. The radio communication system 30 is compliant with a standard of wireless LAN system (WLAN), which is specified in IEEE802.11 and the like.

That is to say, the MN 100 is connectable to multiple radio communication systems of different communication schemes. For example, when the state of a radio signal RS (RSSI, for example) transmitted from the radio base station 11 is degraded, the MN 100 can execute a handover to the radio base station 21, the radio base station 11 constituting the radio communication system 10, the radio base station 21 constituting the radio communication system 20 of a different communication scheme.

Particularly in the present embodiment, the MN 100 stores the amount of variation of the radio state information occurred during the execution of a handover to a different radio communication system, e.g., a handover from the radio communication system 10 to the radio communication system 20. The MN 100 determines a timing of starting a handover from the radio communication system 10 to the radio communication system 20 on the basis of a handover threshold TH (see FIG. 8) for each radio communication system and the stored amount of variation V (see FIG. 8).

(1.2) Functional Block Configuration of Radio Communication Device

Figure 2:
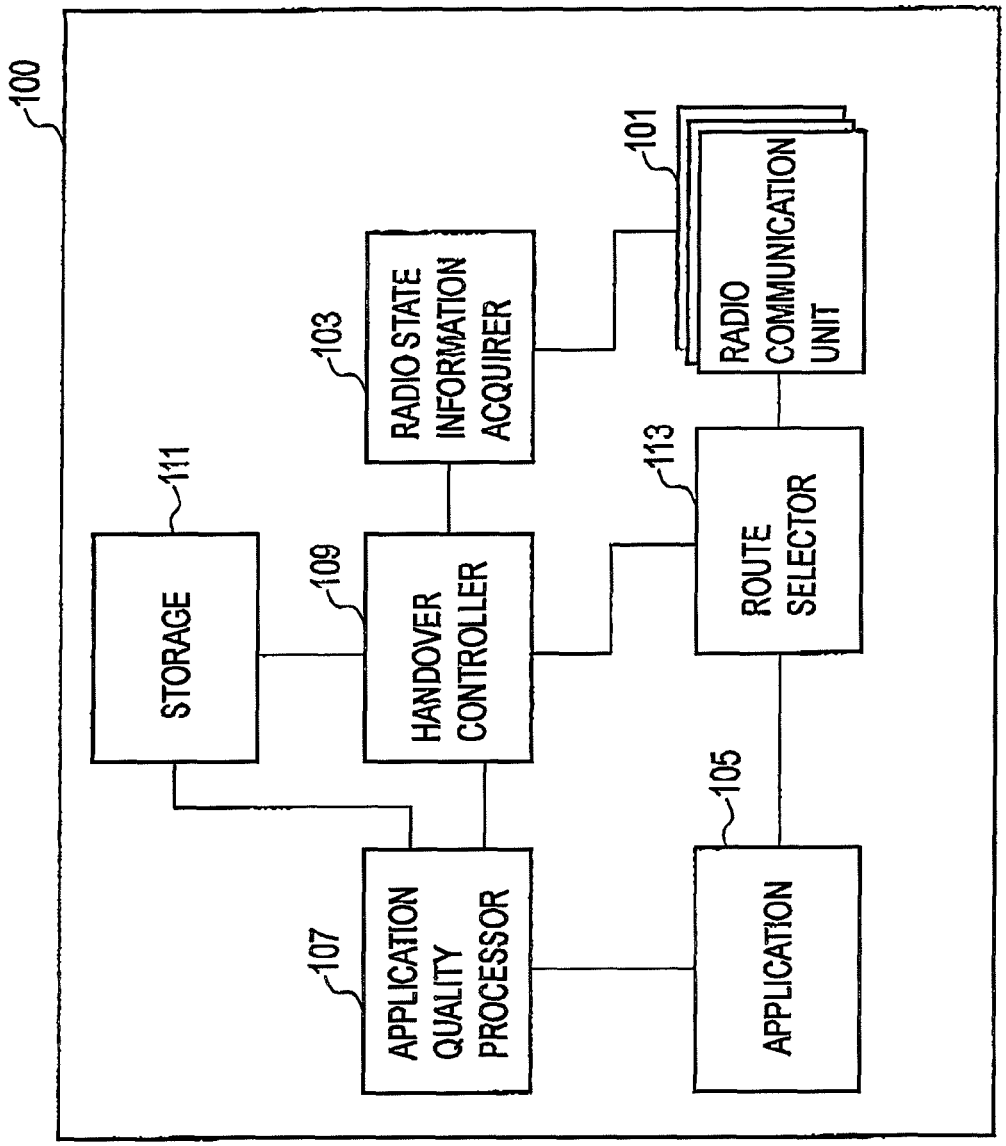
FIG. 2 is a diagram showing a functional block configuration of the radio communication device according to the first embodiment and a second embodiment of the present invention.

FIG. 2 is a diagram showing a functional block configuration of the MN 100 constituting the radio communication device in the present embodiment. As shown in FIG. 2, the MN 100 includes a radio communication unit 101, a radio state information acquirer 103, an application 105, an application quality processor 107, a handover controller 109, a storage 111, and a route selector 113.

The radio communication unit 101 includes radio communication interfaces respectively for connecting to the radio communication systems 10, 20 and 30. Specifically, the radio communication unit 101 includes a radio communication interface used for performing a radio communication with the radio base station 11 compliant with EV-DO. In addition, the radio communication unit 101 includes a radio communication interface used for performing a radio communication with the radio base station 21 compliant with mobile WiMAX. Further, the radio communication unit 101 includes a radio communication interface used for performing a radio communication with the radio base station 31 compliant with WLAN.

The radio state information acquirer 103 acquires pieces of radio state information (RSSI, for example) repeatedly at predetermined cycles, the piece of the radio state information indicating the state of a radio signal RS which the radio communication unit 101 transmits to and receives from the radio base stations 11, 21 and 31.

The radio state information acquirer 103 acquires the radio state information from the radio communication unit 101, and notifies the handover controller 109 of the acquired radio state information. Examples which can be used as the radio state information include RSSI, C/I, transmission power (Tx-Power), and the like.

FIG. 5 shows an example of the radio state information acquired by the radio state information acquirer 103. As shown in FIG. 5, an application (a voice call application using ITU-T G.711 as an audio codec), a radio communication system (EV-DO), a type of the radio state information (C/I or RSSI), and a value of the radio state information piece are associated with one another in radio state information S1.

The radio state information acquirer 103 calculates the mean and variance of N pieces of the radio state information for each combination of an application and a radio communication system. The radio state information acquirer 103 uses the mean, which is less varied, of the radio state information pieces as a threshold to generate a handover threshold TH for each combination of an application and a radio communication system. Note that, in place of the variance, other statistics may be used, such as the deviation (=60).

FIG. 6 shows examples of the handover thresholds TH generated by the radio state information acquirer 103. As shown in FIG. 6, in a handover threshold table TB1, a type of the handover threshold TH and a value of the handover threshold TH are associated with each other for each combination of an application and a radio communication system.

The application 105 is formed of a predetermined application program and an execution environment (such as CPU). In the present embodiment, the application 105 is a voice call application using VoIP.

The application 105 outputs an RTP packet at a predetermined interval (20 ms, for example) to the route selector 113, the RTP packet including audio data encoded by the audio codec. Moreover, the application 105 acquires an RTP packet outputted from the route selector 113.

The application quality processor 107 monitors the communication quality (the number of packet loss or an average interval of packet arrival, for example) of the application 105, i.e., the voice call application in the present embodiment to check if the communication quality is degraded or not. In the present embodiment, the application quality processor 107 constitutes a quality checker.

The handover controller 109 executes a handover to a different radio communication system. In the present embodiment, the handover controller 109 constitutes a handover executor.

Specifically, the handover controller 109 checks whether or not each of the radio state information pieces repeatedly acquired at predetermined cycles satisfies a handover requirement defined by the set handover threshold TH. When the handover requirement is satisfied, the handover controller 109 notifies the route selector 113 of a route selection instruction.

When the application quality processor 107 determines that the communication quality of the application 105 (voice call application) is degraded, the handover controller 109 stores a handover threshold TH (see FIG. 8) in association with the application 105 currently executed, the handover threshold TH being based on the radio state information piece equivalent to that at a time when the communication quality is determined to be degraded.

More specifically, the handover controller 109 causes the storage 111 to store the handover threshold TH therein. In the present embodiment, the handover controller 109 and the storage 111 constitute a threshold storage processor.

In addition, in the present embodiment, the handover controller 109 stores the amount of variation V of the radio state information (see FIG. 8) in association with each radio communication system, the variation occurred during the operation of a handover to a different radio communication system. Specifically, the handover controller 109 causes the storage 111 to store the amount of variation V therein. In the present embodiment, the handover controller 109 and the storage 111 constitute a variation storage processor.

The handover controller 109 executes a handover to a different radio communication system on the basis of the radio state information acquired by the radio state information acquirer 103, and the handover threshold TH and the amount of variation V which are stored in the storage 111.

Figure 7:
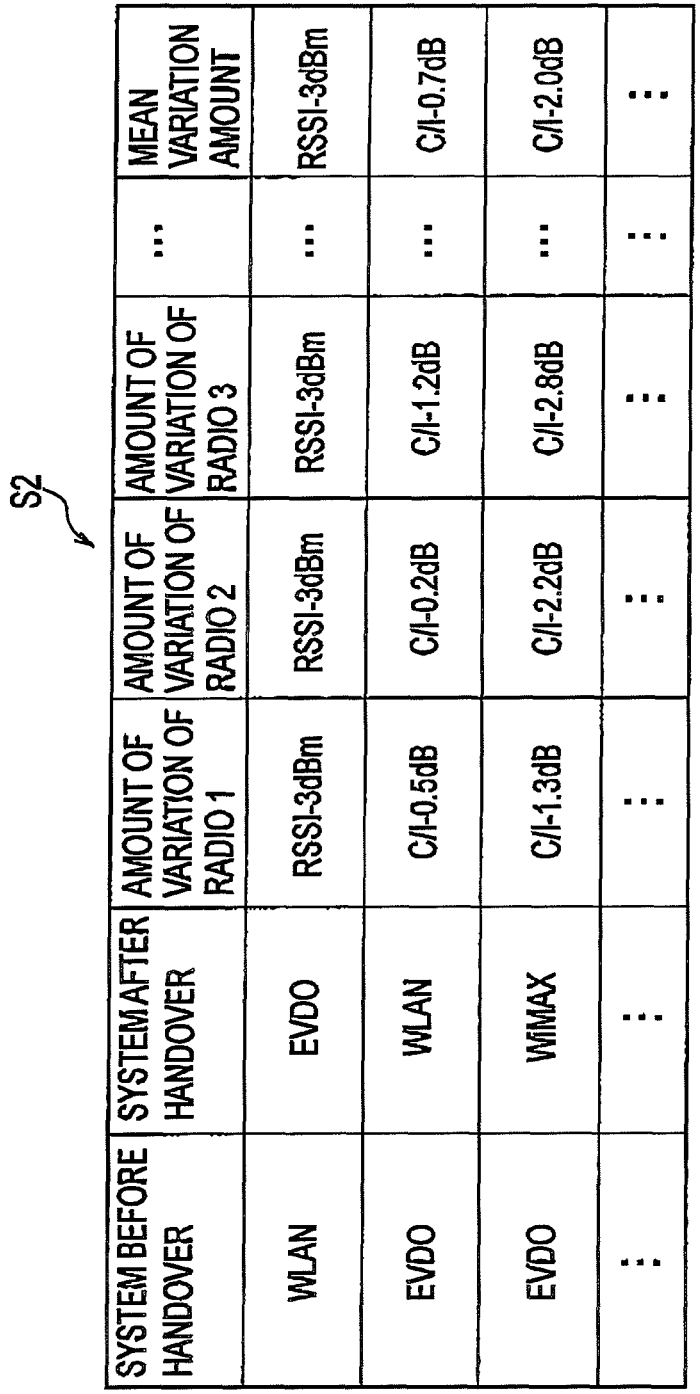
FIG. 7 is a diagram showing an example of variation amount information according to the first embodiment of the present invention.

FIG. 7 shows an example of variation amount information stored in the storage 111. As shown in FIG. 7, a radio communication system before a handover, a radio communication system after the handover, and a value of the amount of variation are associated with one another in variation amount information S2.

The handover controller 109 calculates the amount of variation every time a handover is executed. Then, the handover controller 109 calculates the mean and variance of N pieces of the amounts of variation. The handover controller 109 sets the mean of the pieces of the amounts of variation which has a small variance (RSSI, in the case of the variation amount information S2 shown in FIG. 7) as the amount of variation V (−3 dBm).

The handover controller 109 determines a value of the radio state information at which the handover controller 109 starts a handover to a different radio communication system, on the basis of a handover threshold TH included in the handover threshold table TB1 and the calculated amount of variation V (−3 dBm).

For example, assume a case where a radio communication system before a handover is WLAN, and a radio communication system after the handover (of handover destination) is EV-DO. Here, the handover controller 109 sets RSSI of −85 dBm as a handover threshold TH, as shown in FIG. 6 and FIG. B. As shown in FIG. 7, on the basis of the handover threshold TH and the amount of variation V of −3 dBm, the handover controller 109 starts a handover to the different radio communication system (EV-DO) at a timing t1 when RSSI reaches −82 dBm.

The storage 111 stores therein the radio state information S1 (see FIG. 5) the handover threshold table TB1 (see FIG. 6) and the variation amount information S2 (see FIG. 7).

The route selector 113 selects a communication route, i.e., any of the radio communication system 10, the radio communication system 20, and the radio communication system 30 on the basis of the route selection instruction notified from the handover controller 109.

(1.3) Operation of Radio Communication Device

Figure 3:
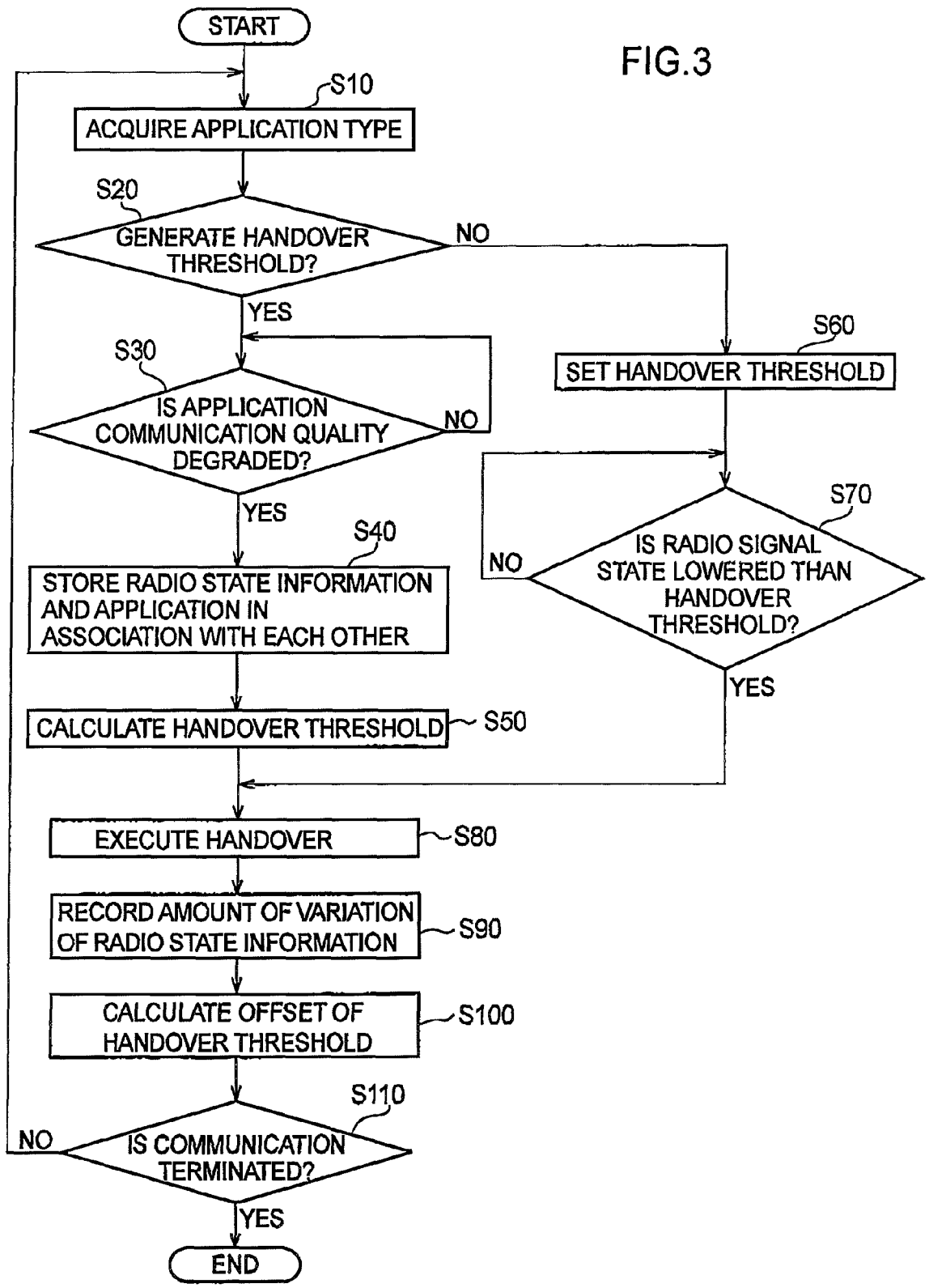
FIG. 3 is a chart showing an operation flow for the radio communication device according to the first embodiment of the present invention to execute a handover to a different radio communication system.

Next, the description is given of an operation of the MN 100. (radio communication device). Specifically, the description is given of how the MN 100 executes a handover to a different radio communication system on the basis of a handover threshold TH and the amount of variation V. FIG. 3 shows an operation flow for the MN 100 to execute a handover to a different radio communication system.

As shown in FIG. 3, in Step S10, the MN 100 acquires a type of an application 105 which is currently in execution (for example, a voice call application using G.729 for an audio codec).

Figure 4:
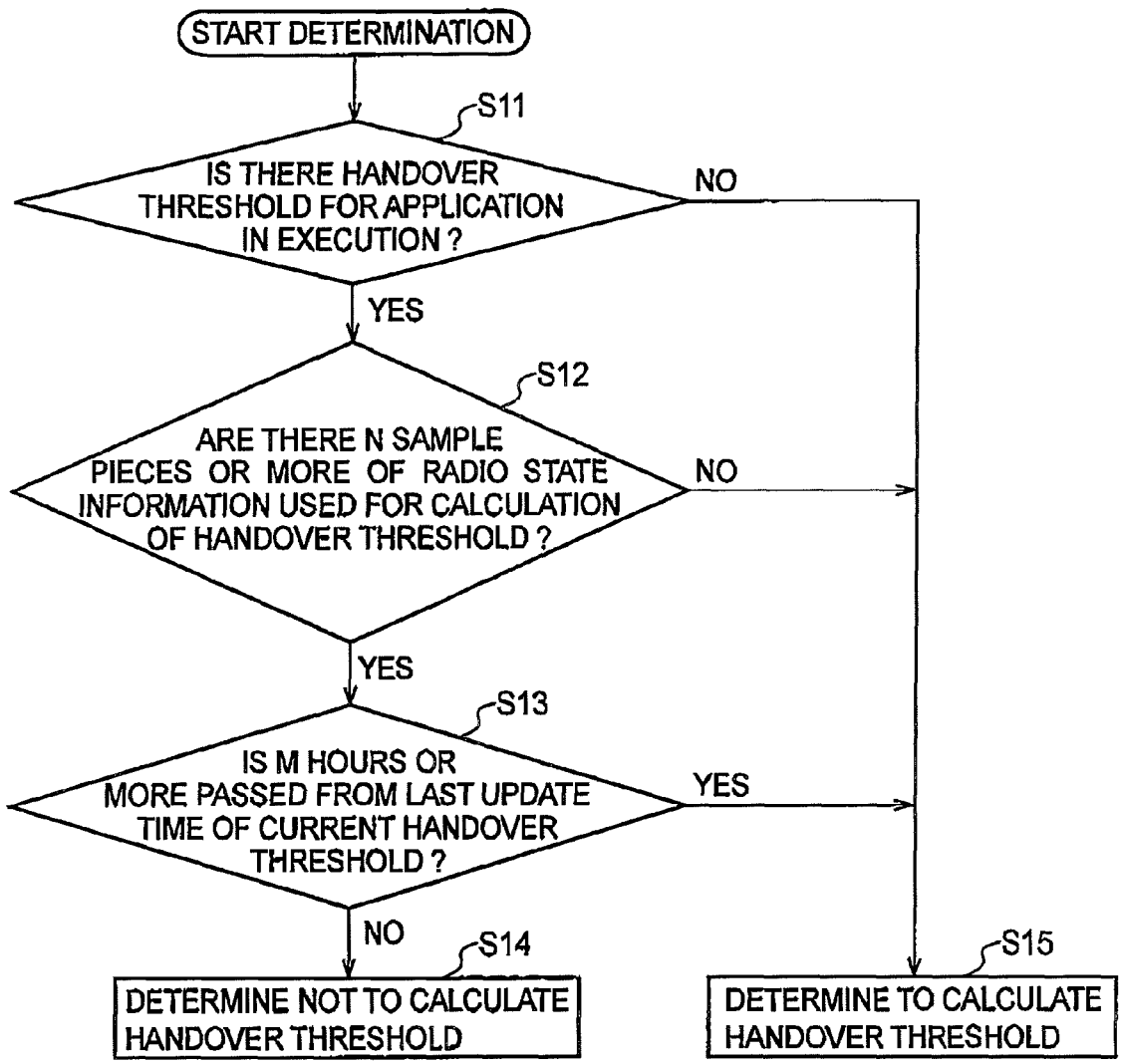
FIG. 4 is a chart showing another operation flow for the radio communication device according to the first embodiment of the present invention to execute a handover to a different radio communication system.

In Step S20, the MN 100 determines whether or not to generate a handover threshold TH. Specifically, the MN 100 determines whether or not to generate a handover threshold TH in accordance with the flow shown in FIG. 4. As shown in FIG. 4, in Step S11, the MN 100 determines whether there is a handover threshold TH for the application in execution, or specifically, for the voice call application.

When there is the handover threshold TH for the voice call application (YES in Step S11), the MN 100 determines in Step S12 whether or not there are N or more sample pieces (10 sample pieces, for example) of the radio state information to be used for calculation of the handover threshold TH.

When there are N or more sample pieces of the radio state information samples to be used for calculation of the handover threshold TH (YES in Step S12), the MN 100 determines in Step S13 whether M hours (72 hours, for example) or more have passed from the last update time point of a handover threshold TH currently set.

When the M hours or more have passed from the last update time point (YES in Step S13), the MN 100 determines in Step S15 to calculate a new handover threshold TH.

The MN 100 also determines to calculate a new handover threshold TH in a case where a determination condition in each of Steps S11 to S13 is negative.

On the other hand, in Step S13, when the M hours (72 hours, for example) have not passed yet from the last update time point (NO in Step S13), the MN 100 determines in Step S14 not to calculate a new handover threshold TH.

As shown in FIG. 3, when it is determined that the handover threshold TH is to be calculated (YES in Step S20), the MN 100 determines in Step S30 whether the communication quality of the application (number of packet loss or an average interval of packet arrival, for example) is degraded or not.

(If YES in Step S30), in Step S40, the MN 100 stores the current state of a radio signal RS (a value of RSSI, for example), that is, the radio state information, and the application currently executed in association with each other.

In Step S50, the MN 100 calculates the handover threshold TH. Specifically, the MN 100 stores a radio state information piece equivalent to that at a time point when the communication quality of the application is degraded, as one of the handover threshold samples.

Here, the MN 100 may calculate the handover threshold TH using other values (deviation, for example) indicating a statistic of the radio state information. Meanwhile, the MN 100 may calculate the handover threshold TH repeatedly if there are N or more sample pieces of the radio state information equivalent to that at a time point when the communication quality of the application is degraded.

On the other hand, when it is determined that the handover threshold TH is not to be calculated (NO in Step S20), the MN 100 sets a handover threshold TH in Step S60. Specifically, the MN 100 sets a handover threshold TH on the basis of the handover threshold table TB1 (see FIG. 6) and the variation amount information S2 (see FIG. 7).

Figure 8:
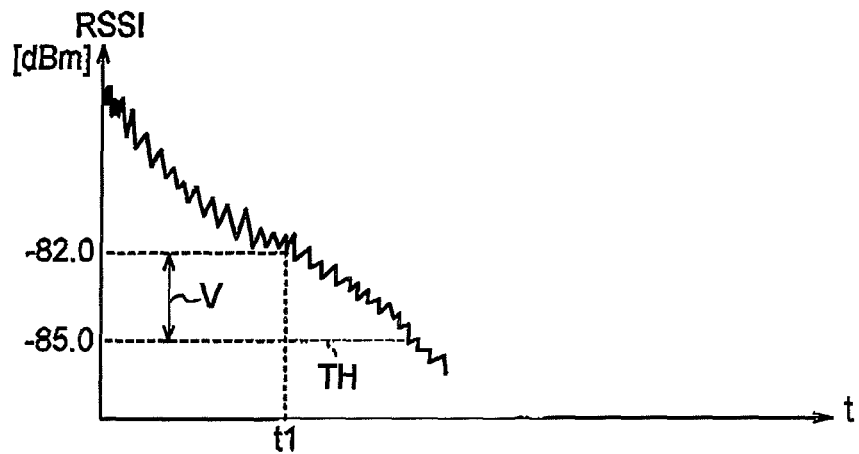
FIG. 8 is a graph showing how RSSI of the radio communication device according to the first embodiment of the present invention changes.

For, example, assume a case where a radio communication system before a handover is WIGAN, and a radio communication system after the handover (of handover destination) is EV-DO. Here, the MN 100 sets RSSI of −85 dBm as a handover threshold TH, as shown in FIG. 8. In addition, on the basis of the amount of variation V of −3 dBm, the MN 100 sets a timing to start a handover to a timing when RSSI reaches −82 dBm (timing t1).

In step S70, the MN 100 determines whether or not the state of the radio signal RS is lowered than the handover threshold TH (−82 dBm, which is the value at a starting timing) thus set.

When the state of the radio signal RS is lowered than the handover threshold TH thus set (YES in Step S70), the MN 100 executes the handover to a different radio communication system in Step S80.

In Step S90, the MN 100 records the amount of variation of the radio state information occurred during a period of executing a handover to a different radio communication system.

On the basis of N sample pieces of the amounts of variation thus recorded, the MN 100 calculates in Step S100 the amount of variation V to be used as an offset of the handover threshold TH. Specifically, the MN 100 calculates the amount of variation V (−3 dBm, for example) on the basis of the variation amount information S2 including pieces of the amounts of variation respectively recorded through N times of executed handovers to different radio communication systems.

When there are N or more sample pieces of the amounts of variation, the MN 100 calculates the mean and variance for each type (RSSI, CIR, and TxPower) of the radio state information included in the radio state information S1 (see FIG. 5). Here, the MN 100 acquires one sample piece of the amount of variation in each handover execution, and thus acquires N sample pieces of the amounts of variation by performing N times of the handover execution. Moreover, as a handover threshold TH, the MN 100 uses the mean of a type of the radio state information (RSSI, for example), the type having the smallest variance.

In Step S110, the MN 100 determines whether or not the communications have terminated, i.e., whether or not the voice call using the voice call application has terminated.

After the termination of the communications (YES in Step S110), the MN 100 ends the processing. Meanwhile, when the communications have not terminated (NO in Step S110), the MN 100 repeats the processing from Step S10.

In Step S13 described above, when the M hours (72 hours, for example) or more have passed from the last update time point of the handover threshold TH, sampling of pieces of radio state information is executed in order to calculate a new handover threshold TH. Here, the MN 100 may sequentially increase the number of sample pieces of the radio state information in a case where comparison of statistics of the pieces of radio state information newly acquired through the sampling with the statistics of the pieces of radio state information used for calculating the current handover threshold TH shows that the deviation of the radio state information falls within the range of 40 to 60, i.e., in a case where statistics of the pieces of radio state information newly acquired through the sampling can be determined to be values which are reliable to some extent as a handover threshold TH.

On the other hand, when the deviation is out of the range, the MN 100 may determine that the characteristics of the radio transmission channel vary largely and continue sampling of pieces of radio state information. The MN 100 may continue the sampling for a predetermined period, and then determine whether or not to change the current handover threshold TH for the newly calculated handover threshold TH.

(1.4) Operation/Effect

The MN 100 stores a handover threshold TH in association with the application, the handover threshold TH being based on a piece of radio state information equivalent to that at a time when the communication quality of the application 105 is degraded. The MN 100 also stores the amount of variation V of the radio state information in association with the radio communication system, the amount of variation V occurred during the handover execution. The MN 100 executes a handover to a different radio communication system on the basis of the radio state information, the handover threshold TH, and the amount of variation V.

Accordingly, it is possible to set a handover threshold TH, which is based on the radio state information affecting the communication quality of the application, in consideration of the variation range of a value of the radio state information which may vary during the handover execution. In other words, the MN 100 can execute a handover to a different radio communication system at a timing appropriate for each application without affecting the application.

Specifically, the value of the radio state information at which a handover is started is determined on the basis of the handover threshold TH and the amount of variation V. Therefore, the MN 100 can reliably execute a handover well before the value of the radio state information reaches a value which affects the communication quality of the application.

(1.5) Modification Example

Figure 9:
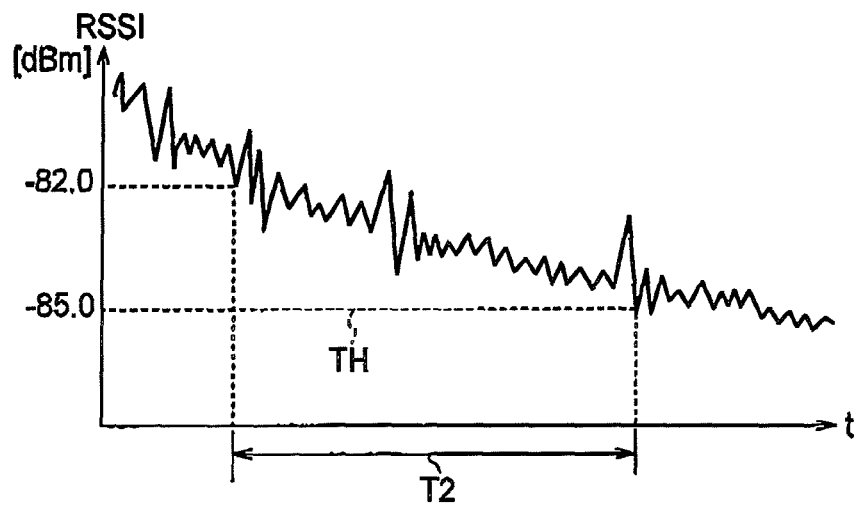
FIG. 9 is a graph showing how RSSI of a radio communication device according to a modified example of the first embodiment of the present invention changes.
Figure 11:
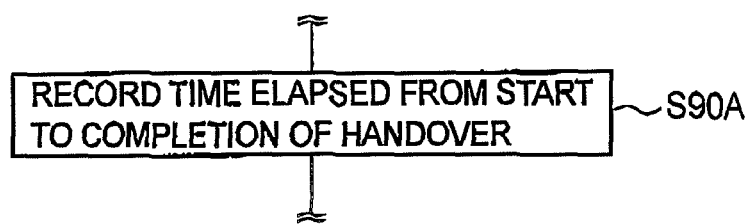
FIG. 11 is a chart showing an operation flow of the radio communication device according to the modified example of the first embodiment of the present invention.

Next, a description of a modification example according to the present embodiment is given with reference to FIG. 9 to FIG. 11. In the above-described embodiment, the MN 100 executes a handover to a different radio communication system on the basis of the handover threshold TH and the amount of variation V. Instead of the amount of variation V, reaching time T2 (see FIG. 9) for the radio state information to reach a handover threshold TH associated with the radio communication system before the handover may be used.

To be more specific, during a handover to a different radio communication system, the handover controller 109 stores the reaching time T2 for the radio state information to reach a as handover threshold TH associated with the radio communication system before the handover, in association with the radio communication system. In the present modification example, the handover controller 109 and the storage 111 constitute a reaching time storage processor.

Here, the reaching time T2 can be set as time elapsed from a time point when the handover controller 109 starts a handover to a different radio communication system until when the radio state information reaches a handover threshold TH associated with the radio communication system before the handover. Alternatively, instead of using the time point when the handover controller 109 starts the handover, any timing after the start of the handover may be used, for example.

The handover controller 109 executes a handover to a different radio communication system on the basis of the radio state information acquired by the radio state information acquirer 103, and the handover threshold TH and the reaching time T2 which are stored in the storage 111.

FIG. 10 shows an example of the reaching time T2 stored in the storage 111. As shown in FIG. 10, a radio communication system before a handover, a radio communication system after the handover, and a value of the reaching time T2 are associated with one another in reaching time information T3. Here, the handover controller 109 may use the mean of multiple pieces of the reaching time T2, as is the case of the amount of variation V described above.

For example, assume a case where a radio communication system before a handover is MAN, and a radio communication system after the handover (of handover destination) is EV-DO. Here, the handover controller 109 acquires a handover threshold TH (RSSI of −85 dBm) for the voice call application using ITU-T G.711 from the handover threshold table TB1 shown in FIG. 6, and acquires the reaching time T2 (8,400 ms, for example) from the reaching time information S3 shown in FIG. 10.

Then the handover controller 109 measures a change in the current radio state, and predicts, on the basis of the change amount (inclination) of the current radio state, a situation where the radio state (RSSI) is likely to reach −85 dBm after the reaching time T2 (8,400 ms, for example) (predicts a time point when RSSI is −82 dBm in the case of FIG. 9).

When RSSI reaches −82 dBm thereafter, the handover controller 109 starts a handover from WLAN to EV-DO.

In the present modified example, an operation in Step S90A shown in FIG. 11 is executed in place of the operation in Step S90 shown in FIG. 3. Specifically, in Step S90A, the MN 100 stores time elapsed from the start to the completion of the handover, i.e. the reaching time T2. Moreover, in the present modified example, the MN 100 sets in Step S60 a handover threshold TH on the basis of the handover threshold table TB1 (see FIG. 6) and the reaching time information S3 (see FIG. 10). Further, in the present modified example, the processing of Steps S40 and S50 shown in FIG. 3 does not have to be executed.

In the present modified example, the reaching time T2 for the radio state information to reach the handover threshold TR associated with the radio communication system before the handover is stored in association with the radio communication system. The MN 100 executes the handover to the different radio communication system on the basis of the radio state information, the handover threshold TH, and the reaching time T2.

Accordingly, it is possible to set a handover threshold, which is based on the radio state information affecting the communication quality of an application, in consideration of the reaching time T2 for the radio state information to reach a handover threshold TH associated with the radio communication system before the handover. In other words, in the present modification example, a handover to a different radio communication system can be executed at a timing appropriate for each application without affecting the application.

(2) Second Embodiment

Figure 12:
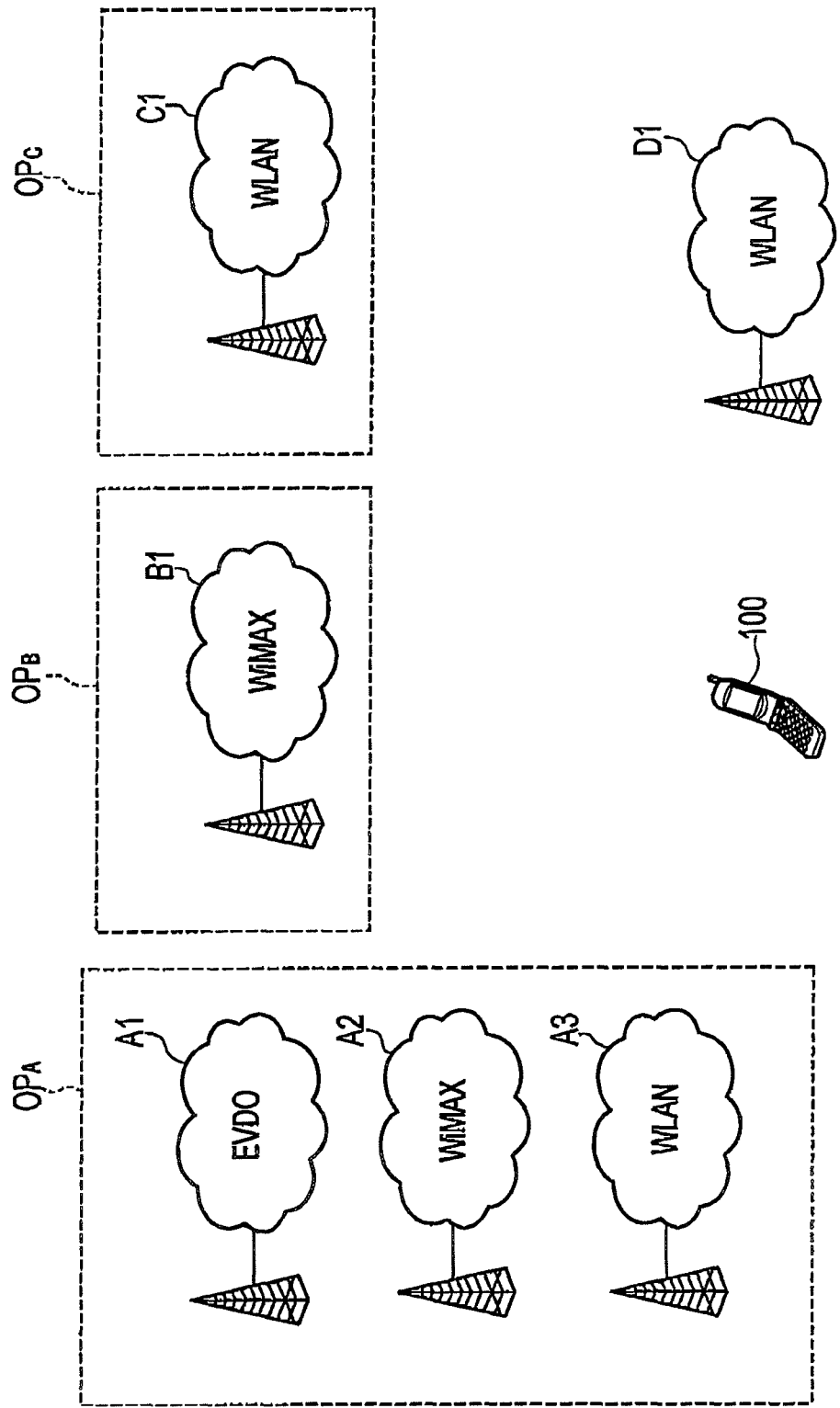
FIG. 12 is a diagram showing an overall schematic configuration of a communication network according to a second embodiment of the present invention.

FIG. 12 is a diagram showing an overall schematic configuration of a communication network according to a second embodiment of the present invention. In the present embodiment, a handover to a different radio communication system is executed on the basis of time required for the handover to the different radio communication system.

Specifically, when a handover is executed to a radio communication system which a different operator (communication carrier) provides, time required for authentication to allow a connection to the radio communication system after the handover, or the like, differs depending to an operator. To address this, in the present embodiment, a handover to a different radio communication system is executed on the basis of the time required for the handover including the time required for the authentication.

Note that the description is given below mainly of portions which differ from the first embodiment (FIG. 1 to FIG. 8) of the present invention, and the description for the similar portions is omitted as appropriate.

As shown in FIG. 12, in the present embodiment, an operator $OP_A$, an operator $OP_B$, and an operator $OP_C$ provide radio communication systems.

Specifically, the operator $OP_A$ provides a radio communication system A1 compliant with EV-DO, a radio communication system A2 compliant with mobile WiMAX, and a radio communication system A3 compliant with WLAN.

The operator $OP_B$ provides a radio communication system B1 compliant with mobile WiMAX. The operator $OP_C$ provides a radio communication system C1 compliant with WLAN.

Furthermore, a radio communication system D1 compliant with WLAN is provided. The radio communication system D1 is an owned and operated radio communication system provided, not by an operator, but by a user of the MN 100 or the like.

In the present embodiment, the handover controller 109 of the MN 100 stores a time T3 in association with the radio communication systems, the time T3 required for a handover to a different communication system (see FIG. 13). In the present embodiment, the handover controller 109 and the storage 111 constitute a required time storage processor.

The handover controller 109 executes a handover to a different radio communication system on the basis of the radio state information acquired by the radio state information acquirer 103, and the handover threshold TR, the amount of variation V of the radio state information, and the required time T3 which are stored in the storage 111.

FIG. 13 shows an example of a handover threshold table TB2 stored in the storage 111. As shown in FIG. 13, the handover threshold table TB2 includes a radio communication system before a handover, an operator before the handover, a radio communication system after the handover, an operator after the handover, the required time T3, and a value of the amount of variation V, which are associated with one another.

In a case where a handover to any of multiple radio communication systems is possible, the handover controller 109 refers to the handover threshold table TB2, sets an offset of the amount of variation V on the handover threshold TH as in the embodiment described above, and then executes a handover to a radio communication system whose required time T3 is short.

Figure 14:
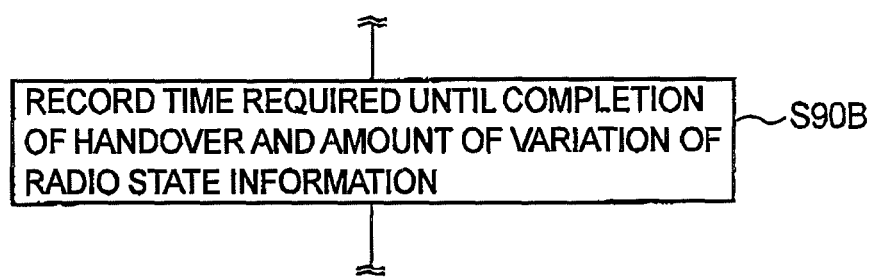
FIG. 14 is a chart showing an operation flow of the radio communication device according to the second embodiment of the present invention.

In the present embodiment, an operation in Step S90B shown in FIG. 14BR> is executed in place of the operation in Step S90 shown in FIG. 3. Specifically, in Step S90B, the MN 100 stores the time T3 required until the completion of the handover to a different radio communication system. Moreover, in the present modified example, the MN 100 sets in Step S60 a handover threshold TH on the basis of the handover threshold table TB2 (see FIG. 13).

The MN 100 according to the present embodiment stores, in association with the radio communication system, the time T3 required for the handover to the different radio communication system. The MN 100 executes the handover to the different radio communication system on the basis of the radio state information, the handover threshold TH, the amount of variation V, and the required time T3.

Accordingly, it is possible to set a handover threshold, which is based on the radio state information affecting the communication quality of the application, in consideration of the time T3 required for the handover to the different radio communication system. In other words, the MN 100 according to the present embodiment can execute a handover to a different radio communication system at a timing appropriate for each application without affecting the application.

In the present embodiment, when being allowed to execute a handover to any of multiple radio communication systems, the MN 100 (handover controller 109) executes a handover to a radio communication system whose required time T3 is short. Accordingly, a handover between systems can be achieved rapidly.

(3) Other Embodiments

As described above, the content of the present invention has been disclosed using the embodiments of the present invention. However, it should be understood that the present invention is not limited by the descriptions and drawings constituting part of the disclosure. In light of the present disclosure, various alternative embodiments will be apparent to those skilled in the art.

For example, the above descriptions on the first embodiment and the second embodiment are given taking the voice call application using VoIP as an example. However, an application to which the present invention is applicable is not limited to the voice call application. The present invention is applicable not only to a real-time application such as the voice call application, but also to a non-real-time application as a matter of course.

As described, the present invention surely includes various embodiments and the like that are not described herein. Therefore, the technical scope of the present invention should be defined only by matters to define the invention according to the scope of claims reasonably understood from the above description.

INDUSTRIAL APPLICABILITY

As described above, the radio communication device according to the present invention is able to execute a handover to a different radio communication system at a timing appropriate for each application without affecting the application. Accordingly, the radio communication device according to the present invention is useful in radio communications such as mobile communications.

The invention claimed is:

1. A radio communication device which is configured to be connectable to multiple radio communication systems of different communication schemes and which is configured to perform communications with a communication destination device through a radio base station by use of a predetermined application, the radio communication device comprising:
a radio state information acquirer configured to acquire radio state information indicating a state of a radio signal transmitted to and received from the radio base station;
a quality checker configured to check whether or not the communication quality of the application is degraded;
a threshold storage processor configured to store therein a handover threshold in association with the application when the quality checker determines that the communication quality is degraded, the handover threshold being determined in advance based on at least a portion of previously acquired radio state information acquired at a time when the communication quality is determined to be degraded;
a handover executor configured to execute a handover from a current radio communication system to a different radio communication system having a different communication scheme than that of the current radio communication system; and
a variation storage processor configured to store in advance therein an amount of variation of the radio state information in association with a handover from the current radio communication system to the different radio communication system, wherein the amount of variation is calculated to be an average mean of two or more previously measured variations of the radio state information associated with a handover from the current radio communication system to the different radio communication system, and
the handover executor executes the handover to the different radio communication system when the radio state information subsequently acquired by the radio state information acquirer reaches the handover threshold stored in the threshold storage processor minus the amount of variation stored in the variation storage processor.

2. The radio communication device according to claim 1, wherein the handover executor determines a value of the subsequently acquired radio state information at which the handover executor is to start the handover, on the basis of the handover threshold and the amount of variation.

3. The radio communication device according to claim 1, further comprising:
a required time storage processor configured to store a time in association with the radio communication system, the time required for the handover executor to execute the handover to the different radio communication system, wherein
the handover executor executes the handover to the different radio communication system on the basis of the subsequently acquired radio state information, the handover threshold, the amount of variation, and the required time.

4. The radio communication device according to claim 3, wherein the handover executor executes the handover to a radio communication system whose required time is shorter than a required time of at least one other radio communication system.

5. The radio communication device according to claim 2, further comprising:
a required time storage processor configured to store time in association with the radio communication system, the time required for the handover executor to execute the handover to the different radio communication system, wherein
the handover executor executes the handover to the different radio communication system on the basis of the subsequently acquired radio state information, the handover threshold, the amount of variation, and the required time.

6. A radio communication device which is configured to be connectable to multiple radio communication systems of different communication schemes and which is configured to perform communications with a communication destination device through a radio base station by use of a predetermined application, the radio communication device comprising:
a radio state information acquirer configured to acquire radio state information indicating a state of a radio signal transmitted to and received from the radio base station;
a quality checker configured to check whether or not the communication quality of each of a plurality of applications application is degraded;
a threshold storage processor configured to store therein a handover threshold in association with at least one application, respectively, when the quality checker determines that the communication quality of the at least one application is degraded, the handover threshold being determined in advance based on at least a portion of previously acquired radio state information acquired at a time when the communication quality is determined to be degraded;
a handover executor configured to execute a handover from a current radio communication system to a different radio communication system having a different communication scheme than that of the current radio communication system; and
a variation storage processor configured to store in advance therein an amount of variation of the radio state information in association with a handover from the current radio communication system to the different radio communication system, wherein the amount of variation is calculated to be an average mean of two or more previously measured variations of the radio state information associated with a handover from the current radio communication system to the different radio communication system, and
the handover executor executes the handover to the different radio communication system when the radio state information subsequently acquired by the radio state information acquirer reaches the handover threshold stored in the threshold storage processor minus the amount of variation stored in the variation storage processor.

* * * * *